United States Patent
Earle

Patent Number: 5,294,022
Date of Patent: Mar. 15, 1994

[54] FLUID DISPENSER WITH A MAGNETICALLY OPERABLE DISCHARGE OPENING

[75] Inventor: Anthony Earle, Middlesex, England

[73] Assignee: Eastman Kodak Company, Rochester, N.Y.

[21] Appl. No.: 18,625

[22] Filed: Feb. 17, 1993

[30] Foreign Application Priority Data

Feb. 20, 1992 [GB] United Kingdom ............... 9203546

[51] Int. Cl.$^5$ ............................................. B67D 5/08
[52] U.S. Cl. ........................................ 222/56; 222/58; 222/504; 141/114; 141/DIG. 1
[58] Field of Search ............... 222/55, 56, 58, 63, 222/77, 105, 504; 141/DIG. 1, 114; 251/65, 7

[56] References Cited

U.S. PATENT DOCUMENTS

| | | | |
|---|---|---|---|
| 4,450,987 | 5/1984 | Boettcher et al. | 222/504 |
| 4,601,411 | 7/1986 | van Overbruggen | 222/504 |
| 4,605,297 | 8/1986 | Livingston et al. | 354/303 |
| 4,626,241 | 12/1986 | Campbell et al. | 604/49 |
| 4,646,784 | 3/1987 | de Leeuwe | 137/565 |
| 4,804,118 | 2/1989 | Mullen et al. | 222/504 |
| 4,848,594 | 7/1989 | Björkengren et al. | 222/504 |
| 4,944,428 | 7/1990 | Gmur et al. | 222/55 |
| 4,958,665 | 9/1990 | Iwano | 141/114 |
| 5,193,593 | 3/1993 | Denis et al. | 141/114 |

FOREIGN PATENT DOCUMENTS

2917254 4/1979 Fed. Rep. of Germany .
WO91/18326 11/1991 PCT Int'l Appl. .
WO91/18327 11/1991 PCT Int'l Appl. .

Primary Examiner—Andres Kashnikow
Assistant Examiner—Philippe Derakshani
Attorney, Agent, or Firm—Frank Pincelli

[57] ABSTRACT

A fluid dispenser comprises an open-topped flexible container (13) which tapers downwardly to a discharge opening (14). The container (13) is mounted on a load platform (11) of a load cell (10). The portion of the container (13) that forms the discharge opening (14) is between one permanent magnet (16) on the load platform (11) and another permanent magnet (17) which is fixed to the material of the container (13). The magnets (16 and 17) attract one another to close the discharge opening (14). An electro-magnetic actuator (18), spaced from the magnet (17), is operable on command from a computer (12) to attract the magnet (17) and open the discharge opening (14). The computer (12) controls a shut-off valve (18) to control filling of the container (13) in accordance with the weight read out from the load cell (10).

7 Claims, 2 Drawing Sheets

FLUID DISPENSER WITH A MAGNETICALLY OPERABLE DISCHARGE OPENING

FIELD OF THE INVENTION

This invention relates to a fluid dispenser comprising a container having an inlet and a dispensing outlet, and more particularly although not exclusively to apparatus including such a fluid dispenser for dispensing fluid which may be a fluidised material, such as a powder, wherein provision is made for monitoring the weight of the contents of the container.

The invention has application to replenishment of chemicals in a photographic process but could be used in pharmaceutical, medical or food processes.

BACKGROUND INFORMATION

At present chemicals are added in fixed amounts every time a film is introduced into a photographic processing system. The amount is metered by a positive displacement pump, usually of the plastic bellows type, which has been adjusted and fixed by its manufacturers. This is wasteful as it makes no allowance for differences in overall exposure from film to film and more chemicals than necessary are often added. If relevant characteristics, such as the development rates and film density are monitored and used to calculate the correct amount of addition, not only may it be necessary to only replenish one chemical component of the process solution, but the amounts of any such addition may be very small. This raises a requirement for apparatus to dispense very small amounts of liquids or powders accurately controlled by weight, WO91/18326 and WO91/18327 disclose such apparatus.

U.S. Pat. No. 4,944,428 discloses apparatus for the automatic determination of a continuous bulk material throughput through a continuous balance.

U.S. Pat. No. 4,605,297 discloses apparatus for insuring application of a preselected amount of processing fluid to photographic film material in which a weight sensing device weighs a container of fluid and permits pumping of the fluid if there is an adequate amount of fluid contained in the container. A magnetic sensing arrangement also effects reversal of the pumping after a preselected length of material has had fluid applied to it.

U.S. Pat. No. 4,646,784 discloses apparatus for dispensing liquid chemicals such as photoresist from containers, in particular collapsible pouch-type containers, which containers have an inlet and a dispensing outlet, and a solenoid-controlled valve which is connected to the dispensing outlet by a plastic tube and which is opened to cause or allow discharge of fluid from the container through the dispensing outlet. The container is suspended from an electric weight detector which is arranged to switch off the solenoid valve automatically when it detects the container is empty.

The apparatus disclosed by each of the prior art references discussed above has a flexible pipe connected to the dispensing outlet of the container and is thereby vulnerable to inaccuracies due to stiffness, varying weight effects and hysteresis.

SUMMARY OF THE INVENTION

According to this invention there is provided a fluid dispenser comprising a container having an inlet and a dispensing outlet, electromagnetically-operable actuating means which are operable by effecting a change in their state of magnetisation to effect opening of closure means to cause or allow discharge of fluid from the container through the dispensing outlet, wherein said closure means are mounted at said dispensing outlet and are magnetically operable by magnet means additional to said electro-magnetically-operable actuating means so that they are normally closed by magnetic attraction to close said dispensing outlet, said electromagnetically-operable actuating means being physically spaced from said closure means when the latter are closed and being operable to effect opening of said closure means against the action of said magnetic attraction.

Preferably the container is flexible and it may taper to the dispensing outlet. The preferred form of closure means comprise a pair of permanent magnets and, where the dispensing outlet is formed by a part of the flexible container, it is convenient for it to extend between the pair of magnets so that it is clamped between the magnets as they are pulled together by magnetic attraction. However the closure means, as well as the actuating means, may be electro-magnetically operable.

The fluid dispenser may be incorporated in apparatus for dispensing fluid which also comprises a weighing device having a load support on which the container is mounted whereby the contents of the container are weighed, weight monitoring means operatively associated with the weighing device and operable to monitor whether or not the weight of the contents of the container has reached a pre-selected amount and control means responsive to said weight monitoring means and operatively associated with said electro-magnetically operable actuating means whereby to effect actuation of such electro-magnetically operable actuating means to effect opening of said closure means and cause or allow the contents of the container to be dispensed through the dispensing outlet, when the weight monitoring means sense that the weight of the contents of the container has reached said pre-selected amount.

The apparatus may include fluid supply means operable to introduce fluid into the container through said inlet and shut off valve means operable to shut off the supply of fluid by said fluid supply means to said container, said control means also being operatively associated with said shut off valve means whereby to operate said shut off valve means to shut off the supply of fluid to said container when said weight monitoring means sense that the weight of the contents of the container has reached said pre-selected value.

BRIEF DESCRIPTION OF THE DRAWINGS

One embodiment of this invention is described now by way of example with reference to the accompanying drawing, of which.

DESCRIPTION OF THE PREFERRED EMBODIMENT

Figure 1:
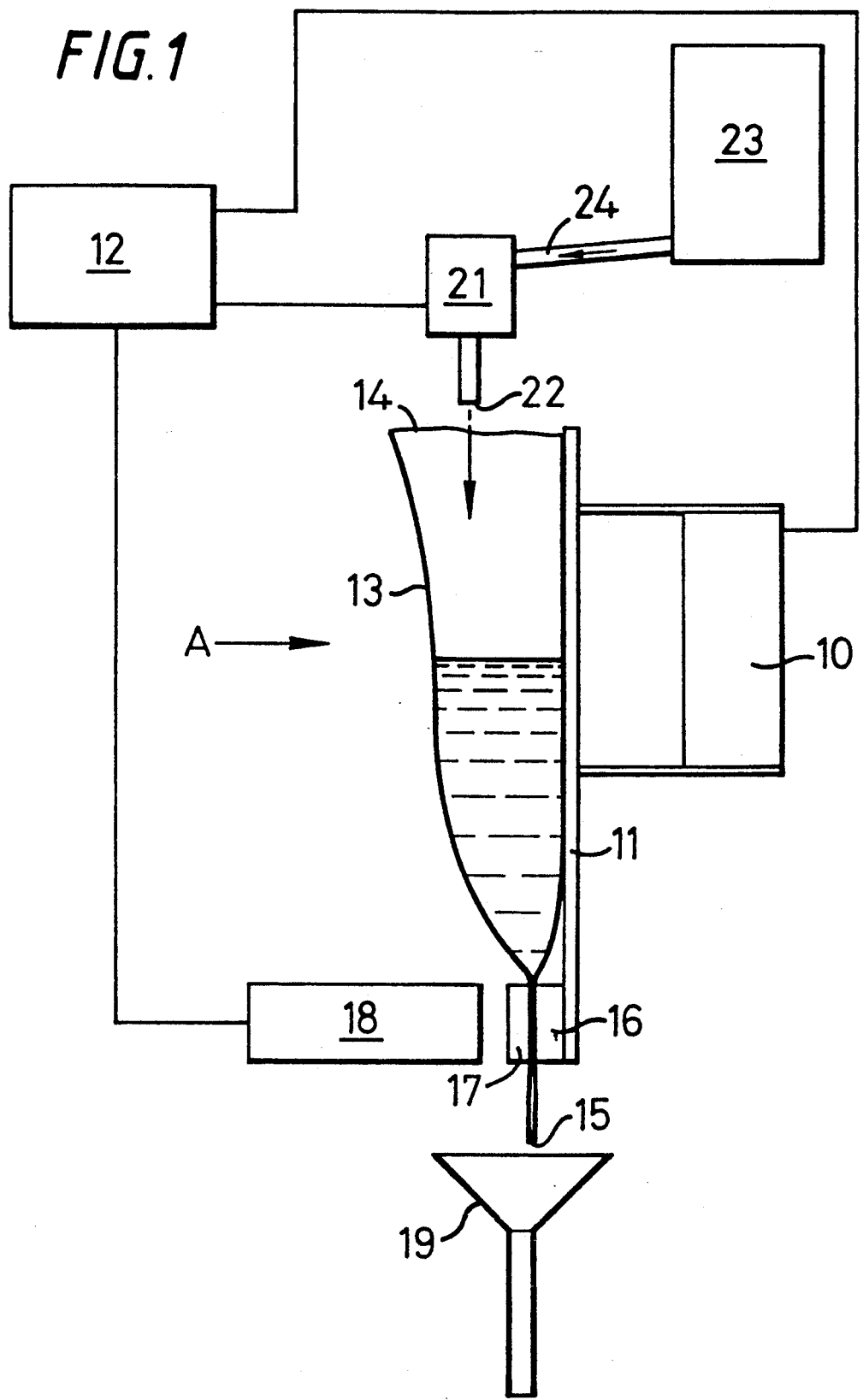
FIG. 1 is a diagram of dispensing apparatus during the charging stage.

FIG. 1 shows the apparatus comprises a weighing device comprising a load cell 10 and a load platform 11 which is generally vertical. The load cell 10 incorporates transducer means operable to respond to a change in load on the load platform 11 and to emit a digital output indicative of that change in load. That digital output is fed into a supervisory computer 12 which functions as control means of the apparatus, monitoring the weight on the load platform 11 as part of that control function.

Figure 2:
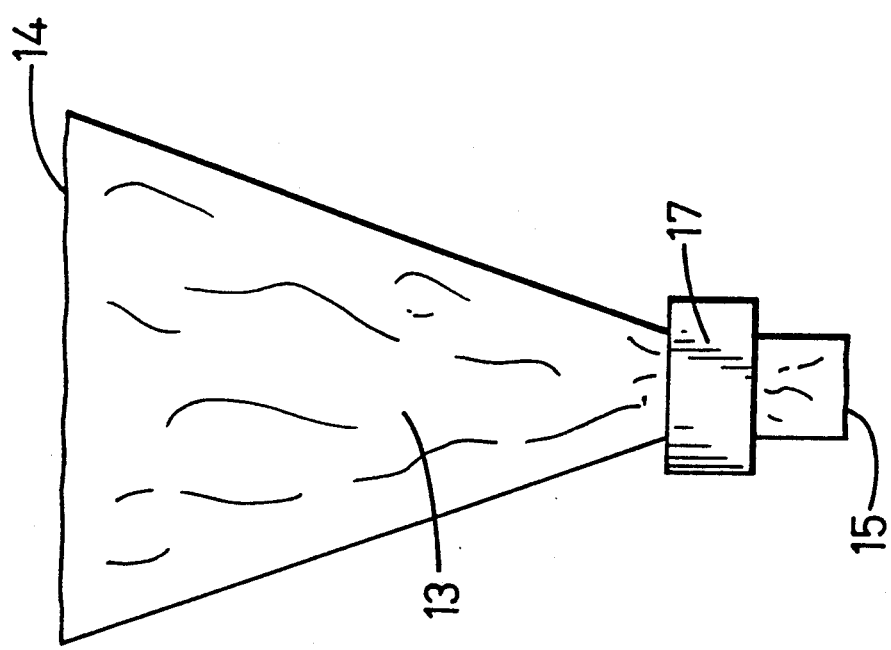
FIG. 2 is a view on Arrow A of the flexible container of the apparatus shown in FIG. 1.

A light flexible container 13 is permanently attached to the load platform 11. The container 13 has an opening 14 at its top and, as is shown in FIG. 2, tapers downwardly to a discharge opening 15 at the bottom. The discharge opening 15 is formed by a small portion of the container 13 which depends from the remainder of the container 13 between one permanent magnet 16, which is mounted on the load platform 11, and another permanent magnet 17 which is fixed to the surface of the depending portion of the container 13 remote from the permanent magnet 16. It is to be understood that the depending portion of the container 13 is normally clamped between the two magnets 16 and 17, the polarisation of the magnets 16 and 17 being arranged so that they are mutually magnetically attracted so that the magnet 17 is urged towards the magnet 16 to clamp the depending portion of the container 13 between them by their mutual magnetic attraction. An electro-magnetically operable actuator 18 is mounted spaced from the magnet 17, but sufficiently close to that magnet 17 to attract that magnet 17 towards it, against the magnetic attraction between the permanent magnets 16 and 17, when energised.

A funnel-type fluid collector 19 is mounted below the dispensing outlet 15 and serves to feed liquid dispensed to it from the container 13 to the processing system. A control valve 21 is mounted above the container 13 and has an outlet 22 by which appropriate replenishment chemicals supplied to the control valve 21 by fluid supply means comprising a suitably located reservoir 23 and a fluid supply conduit 24, are fed into the container 13 through its inlet 14. The control valve 21 is operable to control the rate at which the fluid replenishment is fed into the container 13. That rate is selected to suit the response characteristics of the load cell 10, that is to say to suit the time it takes for the load cell 10 to respond to a change in load on the load platform 11 and to generate the consequent digital output.

Figure 3:
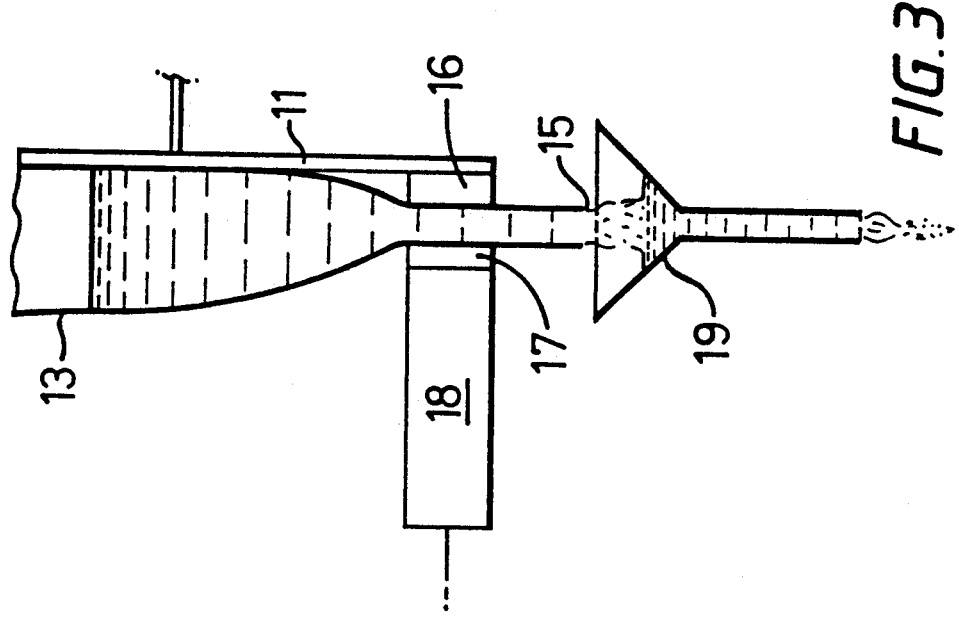
FIG. 3 is a view, similar to FIG. 1, of part of the apparatus during the dispensing phase.

Operation of the electro-magnetically operable actuator 18 and the control valve 21 are controlled by the supervisory computer 12. On command from the computer 12, the valve 21 is opened and the replenishment chemical fluid runs into the flexible container 13, it being understood that the permanent magnets 16 and 17 have closed the dispensing outlet 15. When the correct amount of replenishment chemical fluid has been introduced into the container 13, its weight, which has been sensed by the load cell 10 and monitored by the computer 12, is recognised and the computer 12 responds to switch off the control valve 21 to shut-off supply of further fluid into the container 13. At the same time as the valve 21 is switched off, the electro-magnetically operable actuator 18 is energised to draw the permanent magnet 17 away from the permanent magnet 16 and towards it (as shown in FIG. 3) to open the dispensing outlet 15 and allow the precisely weighed small amount of chemical fluid within the container 13 to be dispensed through the dispensing outlet 15 into the receptacle 19.

The tapered form of the flexible container 13 aids drainage and minimises the size of the closure magnets 16 and 17 that are required, thereby minimising the weight of the apparatus.

It will be understood that there are no pipes or wires connected to the container 13 or the load cell 10. That eliminates inaccuracies due to stiffness, varying weight effects and hysteresis. Opening of the container 13 is by remote control. As a consequence, the tare weight is minimal as the mechanism is minimal and that allows more accurate weighing of small amounts. The apparatus is simple and inexpensive to manufacture. It will be fail-safe in its closed condition. It can handle more than one solution and may be disposable.

Such apparatus could be sterile as well as being disposable, when intended for use in the medical or food industries.

What is claimed is:

1. A fluid dispenser comprising a container having an inlet and a dispensing outlet, electromagnetically-operable actuating means which are operable by effecting a change in their state of magnetisation to effect opening of closure means to cause or allow discharge of fluid from the container through the dispensing outlet, characterised in that said closure means are mounted at said dispensing outlet and are magnetically operable by magnet means additional to said electromagnetically-operable actuating means so that they are normally closed by magnetic attraction to close said dispensing outlet, said electromagnetically-operable actuating means being physically spaced from said closure means when the latter are closed and being operable to effect opening of said closure means against the action of said magnetic attraction.

2. A fluid dispenser according to claim 1 wherein the container is flexible.

3. A fluid dispenser according to claim 1 or claim 2, wherein the container tapers to the dispensing outlet.

4. A fluid dispenser according to claim 3, wherein the closure means comprise a pair of permanent magnets.

5. A fluid dispenser according to claim 4, wherein the dispensing outlet is formed by a part of the flexible container which is between the pair of magnets so that it is clamped between the magnets as they are pulled together by the magnetic attraction.

6. Apparatus for dispensing fluid comprising a fluid dispenser according to claim 5, a weighing device having a load support on which the container is mounted whereby the contents of the container are weighed, weight monitoring means operatively associated with the weighing device and operable to monitor whether or not the weight of the contents of the container has reached a preselected amount and control means responsive to said weight monitoring means and operatively associated with said electro-magnetically operable actuating means whereby to effect actuation of said electro-magnetically operable actuating means to effect opening of said closure means and cause or allow the contents of the container to be dispensed through the dispensing outlet, when the weight monitoring means sense that the weight of the contents of the container has reached said pre-selected amount.

7. Apparatus according to claim 6 including fluid supply means operable to introduce fluid into the container through said inlet and shut off valve means operable to shut off the supply of fluid by said fluid supply means to said container, said control means also being operatively associated with said shut off valve means whereby to operate said shut off valve means to shut off the supply of fluid to said container when said weight monitoring means sense that the weight of the contents of the container has reached said pre-selected value.

* * * * *